United States Patent

Epp et al.

Patent Number: 5,148,947
Date of Patent: Sep. 22, 1992

[54] DRUM EXTENDER APPARATUS FOR MELTING AND DISPENSING HOT MELTS

[75] Inventors: Edwin H. Epp, Roslindale; Joseph W. Dupray, Jr., Ipswich, both of Mass.

[73] Assignee: Bostik, Inc., Middleton, Mass.

[21] Appl. No.: 372,202

[22] Filed: Jun. 26, 1989

Related U.S. Application Data

[63] Continuation of Ser. No. 159,851, Feb. 24, 1988, abandoned.

[51] Int. Cl.$^5$ .............................................. B67D 5/62
[52] U.S. Cl. ................................. 222/146.5; 220/4.03
[58] Field of Search ............. 222/146.2, 146.1, 146.5; 220/5 R, 5 A, 4 A; 294/901, 31.2

[56] References Cited

U.S. PATENT DOCUMENTS

| | | | |
|---|---|---|---|
| 1,734,328 | 11/1929 | Conry | 220/4 A |
| 2,030,344 | 2/1936 | Young | 220/4 A |
| 2,292,310 | 8/1942 | Wilkins | 294/31.2 |
| 2,315,415 | 3/1943 | Gilbert | 220/4 A |
| 2,488,215 | 11/1949 | Mayne | 220/4 A |
| 3,982,669 | 9/1976 | Moore | 222/146.5 |
| 4,073,409 | 2/1978 | Gardner et al. | 222/146.5 |
| 4,474,311 | 10/1984 | Petrecca | 222/146.5 |
| 4,544,085 | 10/1985 | Frazer | 222/146.5 |

FOREIGN PATENT DOCUMENTS

| | | |
|---|---|---|
| 2610415 | 7/1980 | Fed. Rep. of Germany . |
| 2925088 | 9/1984 | Fed. Rep. of Germany . |
| 330038 | 6/1930 | United Kingdom ............... 220/4 A |

Primary Examiner—Robert P. Olszewski
Assistant Examiner—Kenneth Noland
Attorney, Agent, or Firm—Gregory D. Williams; David G. Conlin

[57] ABSTRACT

An improved melting and dispensing apparatus is provided. The apparatus includes an annular drum extender flange which permits the apparatus to be utilized with drums of hot melt or moisture-curable hot melt materials which are completely filled.

15 Claims, 5 Drawing Sheets

DRUM EXTENDER APPARATUS FOR MELTING AND DISPENSING HOT MELTS

This is a continuation of co-pending application Ser. No. 159,851 filed on Feb. 24, 1988, now abandoned.

BACKGROUND OF THE INVENTION

1. Field of the Invention

The invention relates to an improved apparatus for melting and dispensing hot melt type adhesives and sealants.

2. Description of the Prior Art

Apparatus for melting and dispensing hot melt type adhesives and sealants generally comprise a heated platen which fits inside the drum or container of hot melt material to be dispensed. The heated platen is pressed against the surface of the material contained in the drum, resulting in melting of the material. The melted material is forced through an orifice in the heated platen, pumped and dispensed where needed. Melters of the type described above are generally known. For example, models 5510 and 5520 from Nordson Corp. and models DP200 and DG200 from Meltex, Inc. are melters of this type.

One problem with the apparatus described above is that the heated platen includes an 'O' ring seal which is sized to closely contact the inside wall of the drum and prevent leakage of molten adhesive as the platen is pressed downwardly into the adhesive. To insure a close fit and to prevent damage to the expensive 'O' ring seal, care must be taken to position the drum properly. In order to do so, it has been found to be necessary to leave from about four to about eight inches of headspace in the drum. Otherwise, it would be difficult to position the fully loaded drum exactly central to the platen which does not have the same diameter as that of the drum. In addition, if a full drum were supplied without the headspace, as the heated platen would melt its way into the adhesive, the molten adhesive would fill the annular cavity between the outside of the platen and the inside of the drum. This molten material would be forced up and over the lip of the barrel until the 'O' ring seal came into contact with the rim of the container and sealed it up.

With such apparatus, a drum cannot be completely filled because the headspace of about four to about eight inches must be left to accommodate the heated platen. The practice of only partially filling drums is wasteful, causing more drums to be filled and shipped as well as more frequent drum changes during operation of the melter dispenser.

With the advent of moisture curable compounds, the practice of partially filling drums presents even greater problems. Drums are normally filled by freshly processed materials which typically are warm or hot. As these materials cool they contract causing a vacuum which pulls in outside air. Because this outside air contains moisture, it can start the curing reaction which will result in surface skinning. Depending on the material, such skins can be very difficult to remove as well as being a waste of material.

It is an object of the present invention to provide an improved melting and dispensing apparatus which can accommodate completely filled drums.

SUMMARY OF THE INVENTION

These and other objects of the invention are accomplished by employing an annular drum extender flange positioned upon the top of a completely filled drum and sized such that its inside diameter is about the same as that of the drum and its height is sufficient to engage the 'O' ring seal of the heated platen. Clamping means for securing the annular flange to the top of the cylinder and also provided. The drum extender is adapted to allow the 'O' ring seal to enter and withdraw from the drum without damage to the expensive 'O' ring seal.

DESCRIPTION OF THE PREFERRED EMBODIMENT

Figure 1:
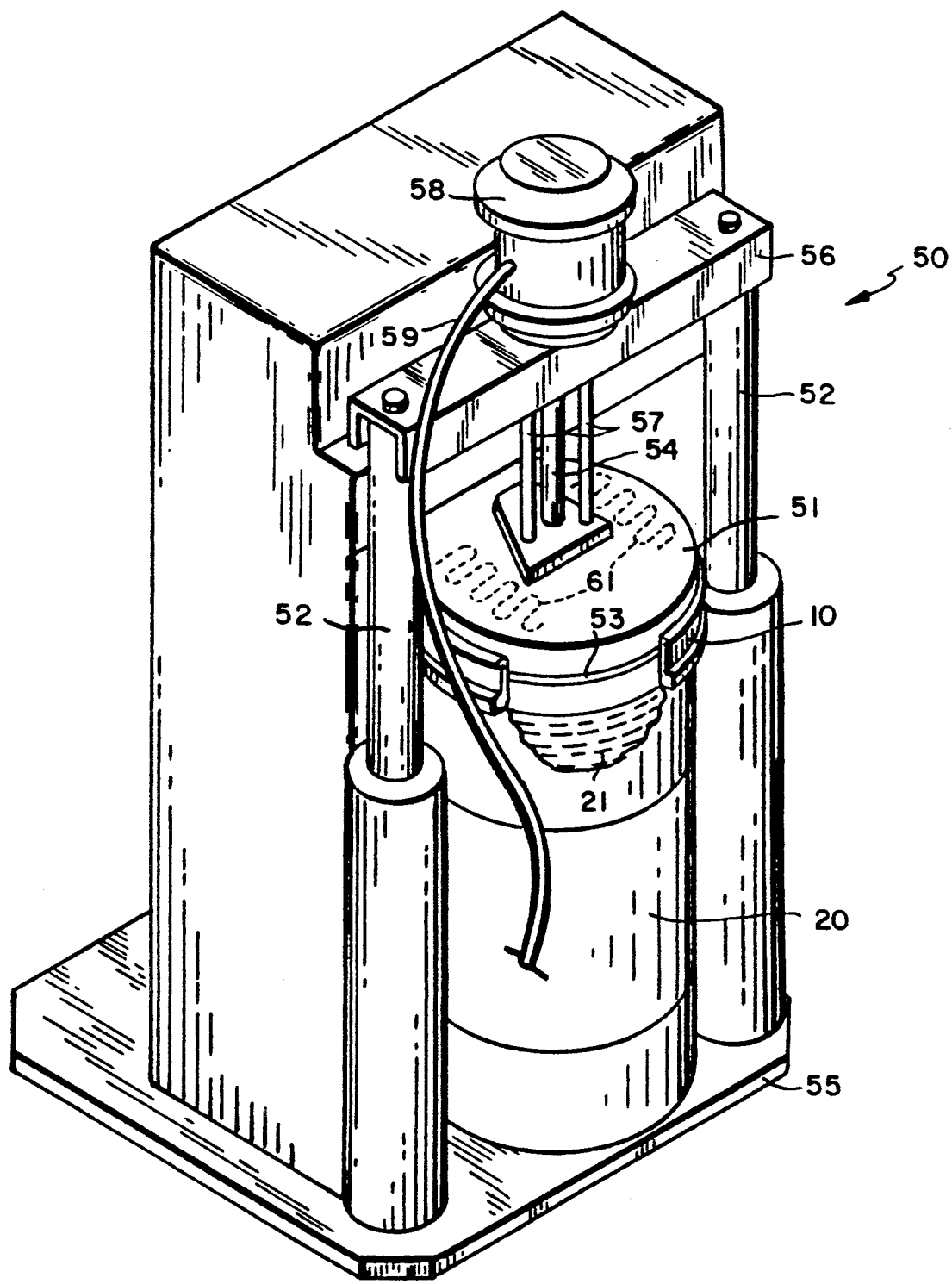
FIG. 1 depicts a melting and dispensing apparatus according to the present invention operating upon a drum which has one embodiment of a drum extender in position, with a portion of the drum and drum extender broken away to show the adhesive material in the drum.
Figure 2:
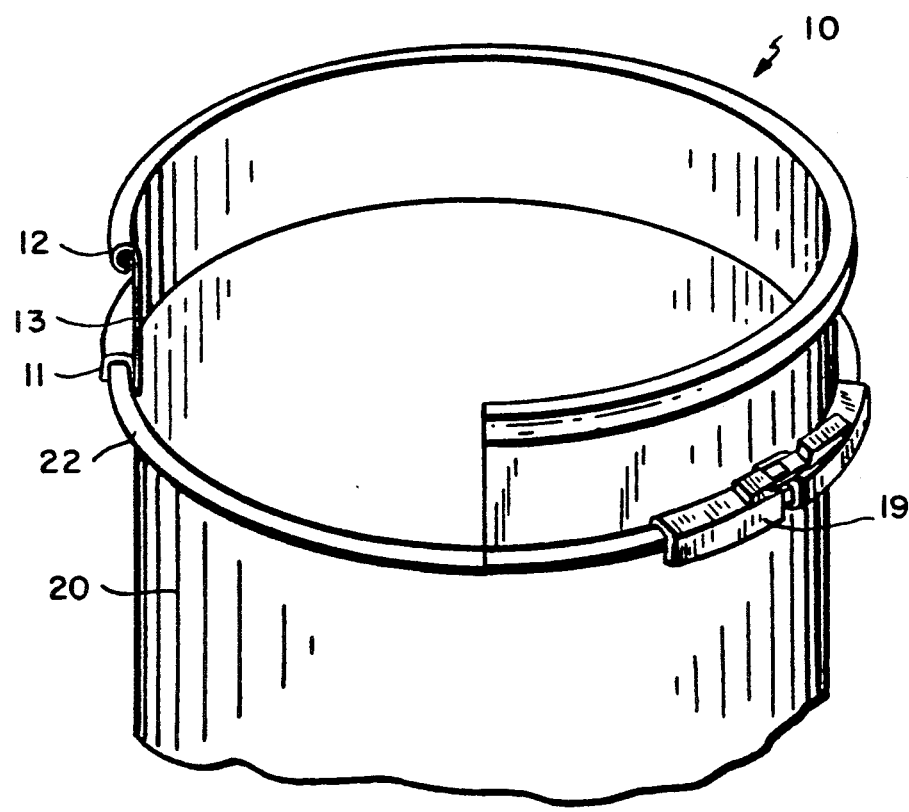
FIG. 2 depicts one embodiment of a drum extender with a portion thereof broken away, mounted on the top of an open head drum.
Figure 3:
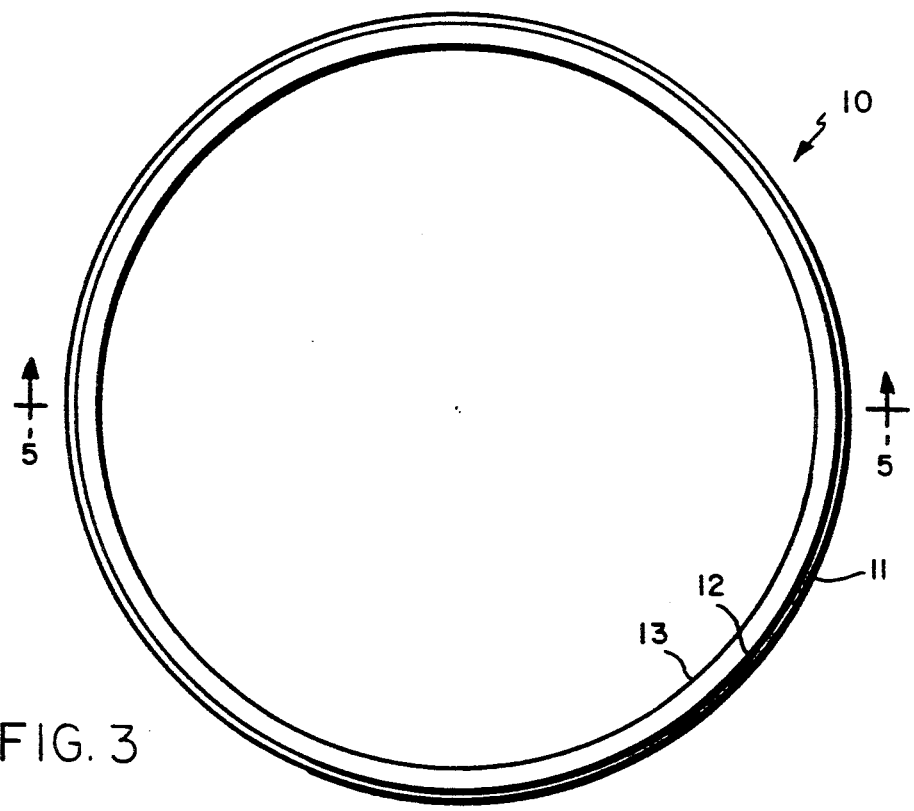
FIG. 3 is a top view of one embodiment of a drum extender according to the present invention.
Figure 4:
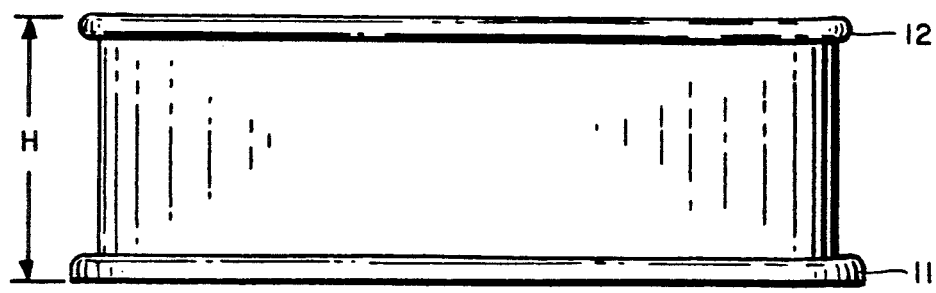
FIG. 4 is a side view of one embodiment of a drum extender according to the present invention.
Figure 5:
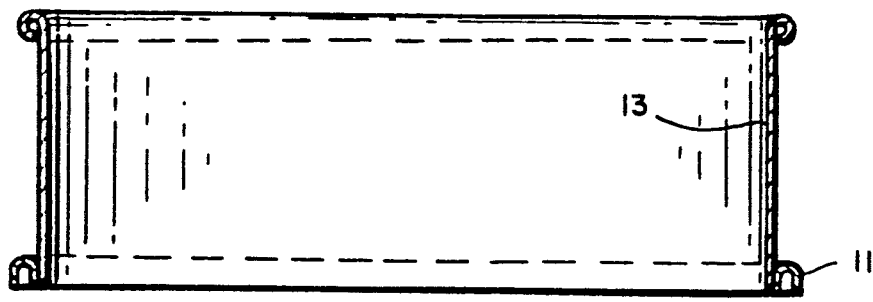
FIG. 5 is a sectional view of one embodiment of a drum extender according to the present invention taken along line 5—5 of FIG. 1.

Referring to FIG. 1, melting and dispensing apparatus 50 includes a base 55 upon which drum 20 is positioned in an upright manner with the open end of the drum pointing up. Heated platen 51 is mounted on a cross bar 56 by supports 57. Cross bar 56 is connected to pistons 52 which move heated platen 51 in a downward direction into drum 20 of material as the material is being melted and dispensed and withdraws heated platen 51 when the drum has been emptied. Pistons 52 can be operated by hydraulic of pneumatic action.

Heated platen 51 is cylindrically shaped and includes an 'O' ring seal 53 on its side. The 'O' ring seal closely contacts the inside wall of the drum to prevent adhesive from seeping around, up, and over heated platen 51 as the platen is pressed into the material contained in the drum. In the case of moisture curing compounds, 'O' ring seal 53 also prevents the entry of moisture which would prematurely begin the curing process. Heated platen 51 also contains an orifice 54 through which molten material is withdrawn from the drum. Orifice 54 is connected to pipe 60 which, in turn, is connected to pump 58 located on cross bar 56. Pump 58 pumps the adhesive material through line 59 to wherever it is ultimately dispensed. Heated platen 51 may be heated by electrical resistance wires 61 embedded therein, by steam or heat transfer liquid.

Melting and dispensing apparatus 50 is typically operated by positioning a drum 20 of a hot melt adhesive or sealant material directly under heated platen 51 and lowering heated platen 51 into the drum until the heated surface contacts the surface of the material 21 to be melted and dispensed. As the heat from heated platen 51 melts the material 21, the molten material is pumped out through orifice 54 and pipe 60. Pistons 52 press heated platen 51 in a downward direction into the material 21. It has previously been necessary to leave a headspace in the drum so that heated platen 51 can be properly aligned with the drum to prevent damage to 'O' ring seal 53 and to prevent spillover of adhesive. Such headspace can be eliminated, however, by utilizing annular flange drum extender 10.

Figure 8:
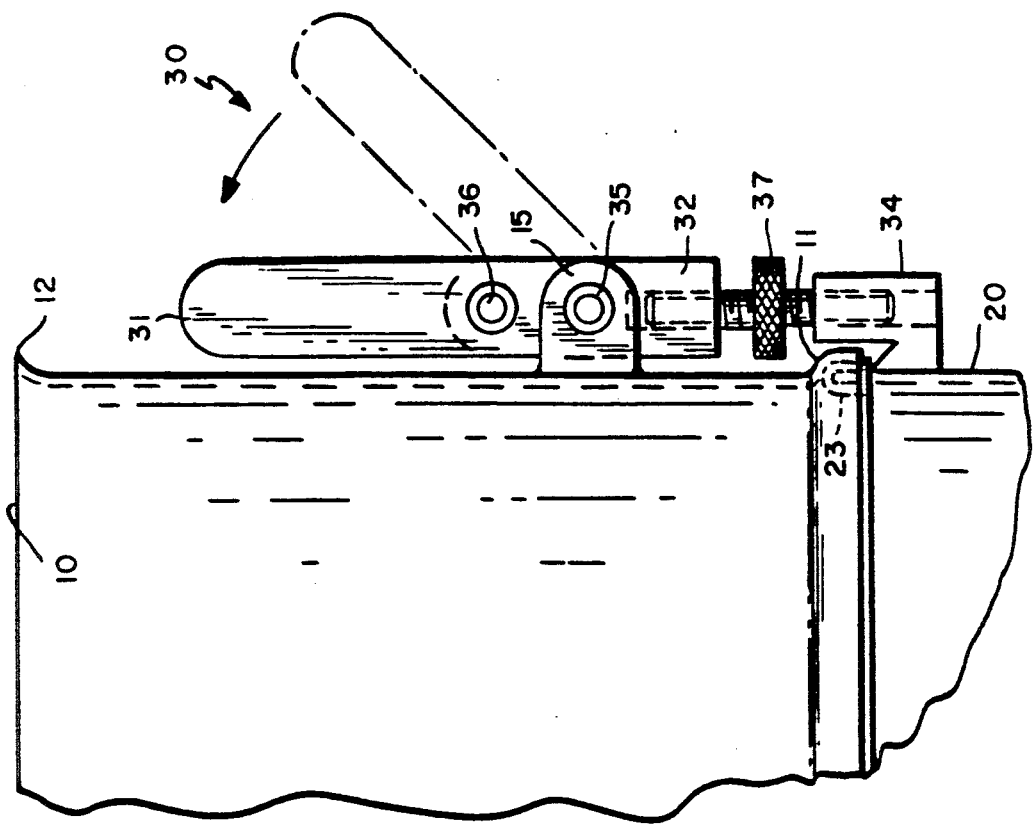
FIG. 8 is a sectional view of another embodiment of the drum extender utilized for closed head drums and a side view of another embodiment of a clamping device for use with closed head drums.

Drum extender 10 comprises an annular flange 13 having an inside diameter about the same as that of drum 20. Drum extenders with different diameters may be provided to accommodate different sized drums and different sized melting and dispensing apparatus. Also, drum extenders with slightly different configurations may be utilized for both open and closed head drums. The drum extender 10 has a height H which is sufficient to engage to 'O' ring seal of the heated platen with which it will be used. Different positions of the 'O' ring seal on the various types of heated platens will necessitate different heights H of the drum extender to ensure that the drum extender properly engages the 'O' ring seal. The drum extender includes lip means 11 to cooperate with the top of a drum. FIGS. 2-5 depict an inverted U-shaped lip 11 which may be utilized to mount the drum extender upon the roll 22 typically found on open drums. For such use, lip means 11 must be sized to accommodate a standard drum cover gasket 14 to prevent leakage. FIG. 8 depicts a slightly different configuration which may be utilized for closed head drums. It is important that lip means 11 not damage 'O' ring seal 53 as it enters and is withdrawn from the drum. In this regard, sharp edges should be eliminated in favor of rolled edges. Preferred are rolled edges slanted slightly away from the platen.

Figure 6:
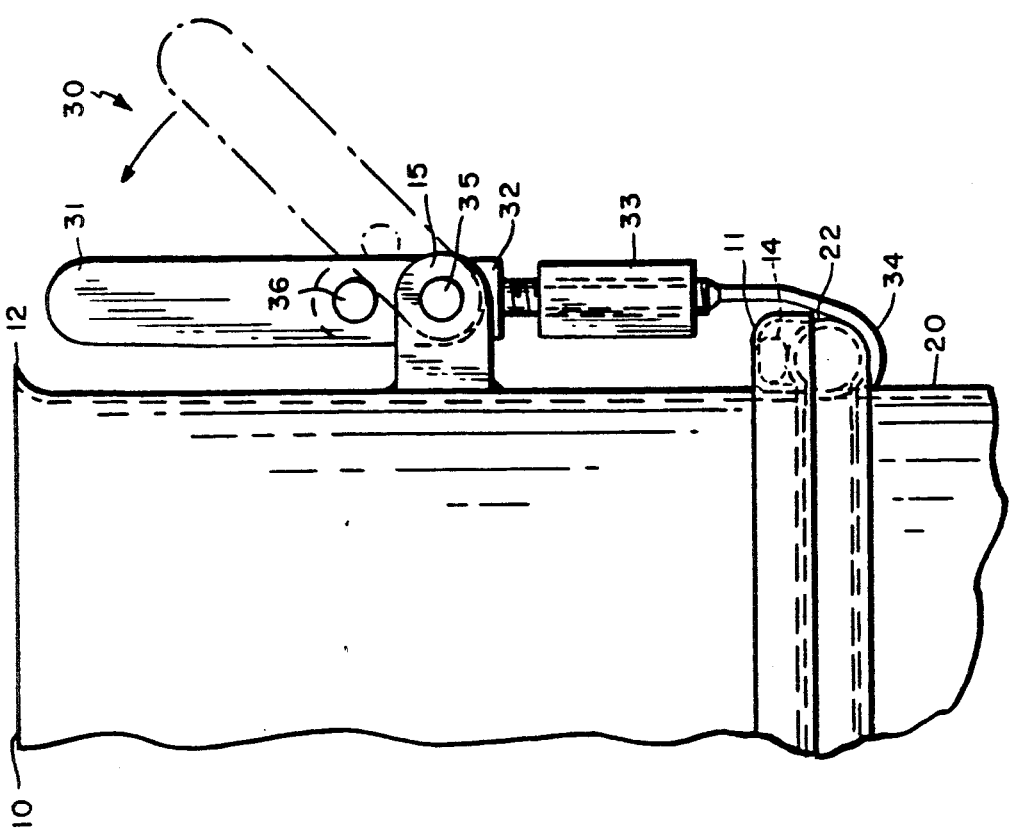
FIG. 6 is a sectional view of another embodiment of the drum extender utilized for open head drums, and a side view of one embodiment of a clamping device for use with open headed drums.
Figure 9:
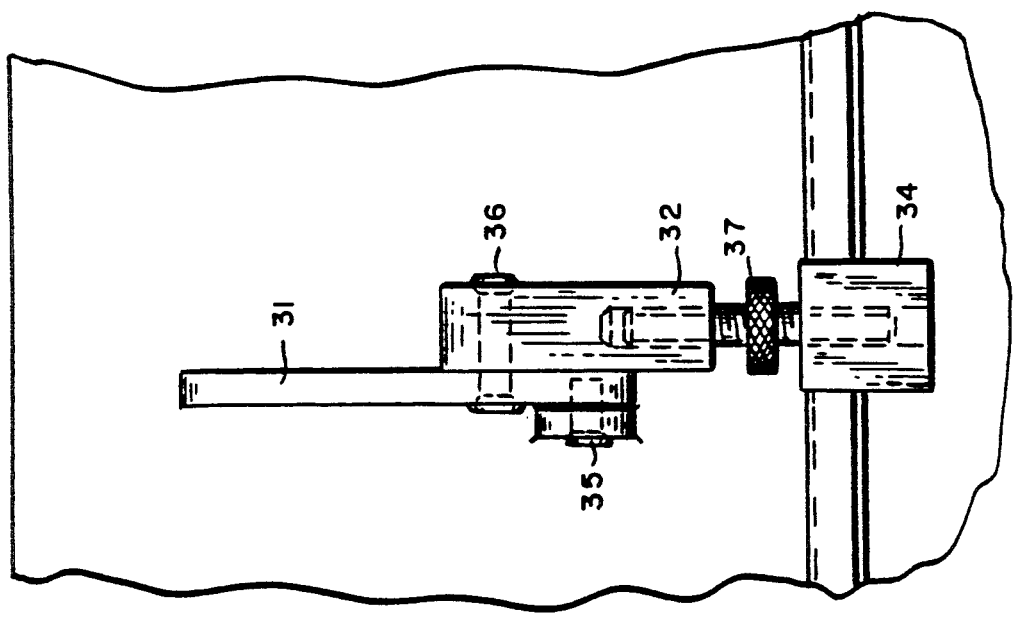
FIG. 9 depicts a front view of the embodiment of the drum extender and clamping device of FIG. 9.

Roll 12 is included on the end of the drum extender opposite that of means 11. Roll 12 is the type typically found in open drums and is provided to impart strength to the drum extender. Other equivalent configurations, such as depicted in FIG. 6, could also be employed as long as they exhibit the requisite stiffness and provide a smooth lead for the flexible 'O' ring seal to enter and withdraw without damage.

The drum extender 10 is normally made of steel. Other materials such as high melting thermoplastics with good rigidity or thermo-setting compositions may also be utilized to produce the drum extender of the present invention. Examples include polypropylenes, Nylon 6, Nylon 6,6, high density polyethylene, glass reinforced unsaturated polyesters or epoxy.

In utilizing the drum extender, care must be taken to avoid buildup of cured or dried adhesive or sealant to prevent damage to the 'O' ring seal that such materials could cause. In this regard, the drum extender should be cleaned before each use. It is preferred that the all of the inside surfaces of the drum extender, including flange 13 and lip means 11, be coated with a non-stick coating. Examples of materials which can be utilized for the non-stick coating include the tetrafluoroethylene fluorocarbon polymers or fluorinated ethylene-propylene resins sold under the trademark Teflon. Other equivalent non-stick materials may also be employed. With a non-stick coating cleaning and removal of any cured or dried residue will not be difficult to accomplish.

The drum extender may be fastened to the drum using cover clamping ring 19 in the same manner that a cover is fastened to the drum. Alternatively, a clamping mechanism such as shown in FIGS. 6 through 9 could be directly incorporated onto the drum extender.

Figure 7:
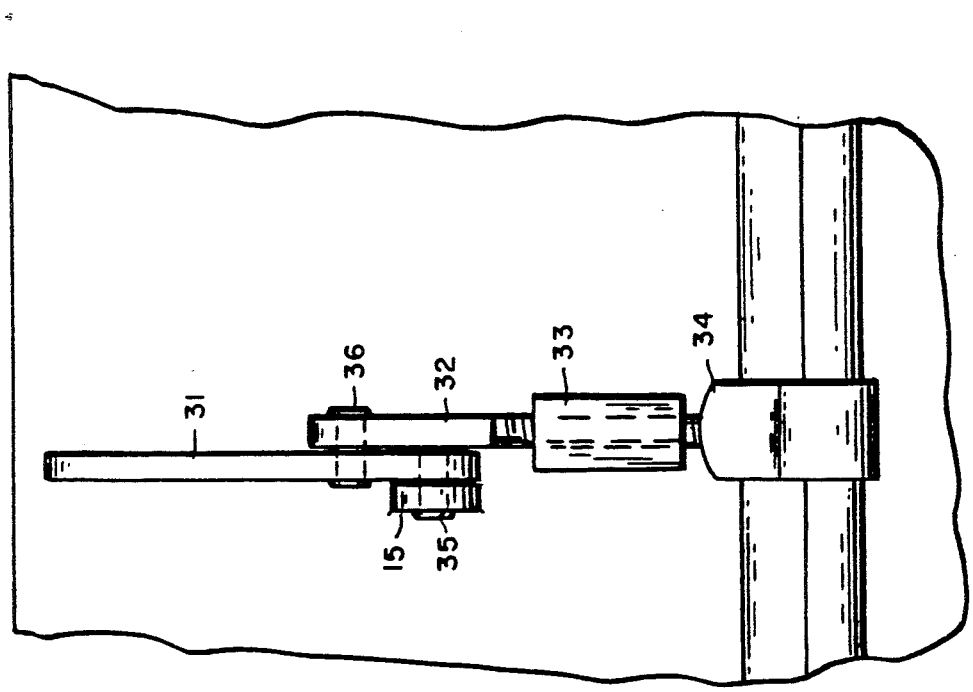
FIG. 7 depicts a front view of the embodiment of the drum extender and clamping device of FIG. 6.

Referring to FIG. 6, drum extender 10 has U-shaped lip 11 which fits onto roll 22 of open head drum 20. Gasket 14 fits between lip 11 and roll 22 to prevent leakage. Clamping device 30 includes handle 31, link 32, adjustment nut 33 and gripper 34. Adjustment nut 33 includes right and left hand threads. Mount 15 may be welded onto flange portion 13 of a drum extender made of steel or may actually be a part of a drum extender molded from a plastic or resinous material. Referring to FIG. 7, handle 31 is connected to mount 15 by pin 35. Handle 31 is also connected to link 32 by pin 36. As the handle is moved toward the drum extender gripper 34 is pulled upward to clamp the extender to the roll 22 of the open head barrel.

Referring to FIG. 8, in order to utilize closed head drum, it must first be opened with a drum de-header or opener (not shown) as is known in the art, which leaves a fold of material 23. Drum extender 10 has a modified lip 11, which fits over fold 23. Clamping device 30 is basically the same as depicted in FIGS. 6 and 7 with the exception that gripper 34 is adapted to engage fold 23 and that adjustment screw 37 is provided instead of adjustment nut 33. Adjustment screw 37 has right and left hand threads.

By utilizing the drum extender as described above, a drum of hot melt can be completely filled and utilized with melter dispenser apparatus having a heated platen. The drum extender will accommodate the 'O' ring seal of the heated platen of the melter dispenser and prevent molten material from spilling over the sides. In the case of certain moisture-curable adhesives, such as compositions based on prepolymers derived from aliphatic or aromatic isocyanates, such as diphenyl methane diisocyanate, and polyesters, polyethers or polycaprolactones derived from an aliphatic or aromatic dicarboxylic acid and an aliphatic or aromatic diol, it is preferred to fill the drum, insert a layer of release film, attach the cover and then turn upside-down while the adhesive is cooling. Turning upside-down effectively seals the drum to prevent moisture from entering the drum and the release film prevents the adhesive from bonding the cover to the drum. The release film may be any film to which the adhesive does not bond such as a high density polyethylene film or a laminate which includes high density polyethylene.

While the improved melting and dispensing apparatus has been described for use with hot melts and particularly moisture-curable hot melt compositions, it will be appreciated that the apparatus could also be utilized for other viscous compositions such as epoxys or other types of sealants or adhesives.

We claim:

1. An apparatus for melting and dispensing a hot melt type adhesive which comprises:

a cylindrical container for holding hot melt type adhesive to be melted and dispensed in a molten liquid state, said container having one closed end and one open end, means for supporting said container in an upright position with said open end facing upward, a cylindrical platen having an 'O' ring seal on its side and having an orifice through which molten adhesive is pumped, said platen being positioned to fit into the open end of said container and sized so that the 'O' ring seal slideably engages the inside wall of said container, means for heating said platen to melt said adhesive, pumping means for pumping molten adhesive through said orifice, means for pressing said heated platen in a downward motion into said adhesive and withdrawing said platen when the container has been emptied;

an annular drum extender flange positioned upon the open end of said container, said flange having an inside diameter about the same as that of said container and having a height sufficient to engage said 'O' ring seal of said heated platen, and lip means to cooperate with the open end of said container, and clamping means for securing said annular flange to said container;

whereby the apparatus is capable of accommodating containers completely filled, without headspace.

2. The apparatus of claim 1 wherein said supporting means includes a flat base.

3. The apparatus of claim 1 wherein said heating means includes electrical resistance wires embedded in said platen.

4. The apparatus of claim 1 wherein said pressing means includes pneumatic cylinders.

5. The apparatus of claim 1 wherein said lip means includes a U-shaped lip.

6. The apparatus of claim 1 wherein said clamping means includes a retaining ring.

7. The apparatus of claim 1 wherein said clamping means is attached to the flange and includes a handle connected to a gripper by an adjustable nut or screw wherein said gripper is adapted to engage the open end of said drum.

8. The apparatus of claim 1 wherein said annular drum extender flange is coated with a non-stick coating on the inside wall and on the inside of the lip means.

9. The apparatus off claim 8 wherein said non-stick coating comprises a tetrafluoroethylene fluorocarbon polymer or a fluorinated ethylene-proplyene resin.

10. The apparatus of claim 1 wherein said cylindrical container comprises an open head drum.

11. The apparatus of claim 1 wherein said cylindrical container is filled with a hot melt material to be dispensed.

12. The apparatus of claim 11 wherein said container is filled with a moisture-curable material to be dispensed.

13. The apparatus of claim 12 wherein said moisture-curable material comprises a prepolymer derived from diphenyl methane diisocyanate and a polyester derived from an aliphatic dicarboxylic acid and an aliphatic diol.

14. The apparatus of claim 1 wherein said hot melt adhesive comprises a prepolymer derived from an aromatic of aliphatic isocyanate and a polyester, polyether, or polycaprolactone derived from an aliphatic or aromatic dicarboxylic acid, and an aliphatic or aromatic diol.

15. The apparatus of claim 1 wherein said cylindrical container comprises a closed head drum.

* * * * *